US012197148B2

(12) United States Patent
Takagi

(10) Patent No.: US 12,197,148 B2
(45) Date of Patent: Jan. 14, 2025

(54) TRANSFER DEVICE INCLUDING FASTENER TO FASTEN A HOLDER PORTION AND ANOTHER HOLDER PORTION WHICH HAS A HIGHER RIGIDITY THAN THE HOLDER PORTION

(71) Applicant: Hiroaki Takagi, Kanagawa (JP)

(72) Inventor: Hiroaki Takagi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/223,554

(22) Filed: Jul. 19, 2023

(65) Prior Publication Data

US 2024/0036499 A1 Feb. 1, 2024

(30) Foreign Application Priority Data

Jul. 27, 2022 (JP) ................................ 2022-119536

(51) Int. Cl.
*G03G 15/16* (2006.01)
*G03G 15/01* (2006.01)

(52) U.S. Cl.
CPC ..... *G03G 15/1615* (2013.01); *G03G 15/0189* (2013.01); *G03G 15/1605* (2013.01); *G03G 2215/0193* (2013.01)

(58) Field of Classification Search
CPC ........... G03G 15/1605; G03G 15/1615; G03G 15/167; G03G 15/0189; G03G 15/0194; G03G 2215/1614; G03G 2215/1623; G03G 2215/0122; G03G 2215/0125; G03G 2215/0138; G03G 2215/0141; G03G 2215/0193
USPC ................ 399/121, 299, 302, 303, 308, 313
See application file for complete search history.

(56) References Cited

U.S. PATENT DOCUMENTS 9,367,018 B1 6/2016 Yanagawa et al.
2002/0006295 A1* 1/2002 Kitahara .............. G03G 15/167 399/314
2010/0239333 A1* 9/2010 Saito .................. G03G 15/1605 399/302
2011/0286759 A1 11/2011 Ichihashi et al.
2012/0190489 A1 7/2012 Takagi
2015/0212454 A1* 7/2015 Ichikawa ........... G03G 15/1685 399/121
2015/0240879 A1 8/2015 Takagi et al.
2016/0062300 A1 3/2016 Takagi et al.
(Continued)

FOREIGN PATENT DOCUMENTS

JP 2005-234348 9/2005
JP 2010-145774 7/2010
(Continued)

*Primary Examiner* — Robert B Beatty
(74) *Attorney, Agent, or Firm* — XSENSUS LLP

(57) ABSTRACT

A transfer device includes a belt, a transferor, a holder, a biasing member, and a movement mechanism. The transferor is movable to contact the belt. The holder holds the transferor. The biasing member biases the transferor toward the belt. The movement mechanism contacts the holder and causes the transferor to move in a direction opposite to a direction in which the biasing member biases the transferor. The holder includes a contact portion to contact the movement mechanism and a holder portion. The contact portion includes a material having a higher rigidity than the holder portion.

18 Claims, 8 Drawing Sheets

(56) References Cited

U.S. PATENT DOCUMENTS

| | | | | |
|---|---|---|---|---|
| 2016/0091837 | A1* | 3/2016 | Morita | G03G 15/1615 464/30 |
| 2017/0010576 | A1 | 1/2017 | Takagi et al. | |
| 2018/0074455 | A1 | 3/2018 | Takagi | |
| 2019/0286017 | A1 | 9/2019 | Nakamoto et al. | |
| 2023/0042229 | A1 | 2/2023 | Nakamura et al. | |

FOREIGN PATENT DOCUMENTS

| | | |
|---|---|---|
| JP | 2011-209673 | 10/2011 |
| JP | 2011-242657 | 12/2011 |

* cited by examiner

TRANSFER DEVICE INCLUDING FASTENER TO FASTEN A HOLDER PORTION AND ANOTHER HOLDER PORTION WHICH HAS A HIGHER RIGIDITY THAN THE HOLDER PORTION

CROSS-REFERENCE TO RELATED APPLICATION

This patent application is based on and claims priority pursuant to 35 U.S.C. § 119(a) to Japanese Patent Application No. 2022-119536, filed on Jul. 27, 2022, in the Japan Patent Office, the entire disclosure of which is hereby incorporated by reference herein.

BACKGROUND

Technical Field

Embodiments of the present disclosure relate to a transfer device and an image forming apparatus.

Related Art

In a transfer device in which primary transfer rollers as transferors contact respective photoconductors as latent image bearers via an intermediate transfer belt as a belt to form primary transfer nips, a configuration is known in which the primary transfer rollers move toward and away from the respective photoconductors.

Such a transfer device may have a configuration in which holders to hold primary transfer rollers are disposed and the holders are biased by respective biasing members such as springs to press the primary transfer rollers against the intermediate transfer belt.

For example, in such a transfer device, each of primary transfer rollers is held by one end of a rotator, and a coil spring is attached to another end of the rotator. Applying a force to rotate the rotator in one direction by a biasing force of the coil spring presses the primary transfer roller against the intermediate transfer belt. When the rotator is rotated in a direction opposite to a direction in which the coil spring biases the rotator, the primary transfer roller is separated from the photoconductor.

SUMMARY

In an embodiment of the present disclosure, a transfer device includes a belt, a transferor, a holder, a biasing member, and a movement mechanism. The transferor is movable to contact the belt. The holder holds the transferor. The biasing member biases the transferor toward the belt. The movement mechanism contacts the holder and causes the transferor to move in a direction opposite to a direction in which the biasing member biases the transferor. The holder includes a contact portion to contact the movement mechanism and a holder portion. The contact portion includes a material having a higher rigidity than the holder portion.

In another embodiment of the present disclosure, an image forming apparatus includes the transfer device.

In still another embodiment of the present disclosure, a transfer device includes a belt, a transferor, a holder, and a biasing member. The transferor is movable to contact the belt. The holder holds the transferor. The biasing member biases the transferor toward the belt. The holder includes an attachment portion to which the biasing member is attached and a holder portion. The attachment portion includes a material having a higher rigidity than the holder portion.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 2A is a diagram illustrating primary transfer rollers arranged at respective contact positions; FIG. 2B is a diagram illustrating all primary transfer rollers are arranged at respective separation positions;

Figure 1:
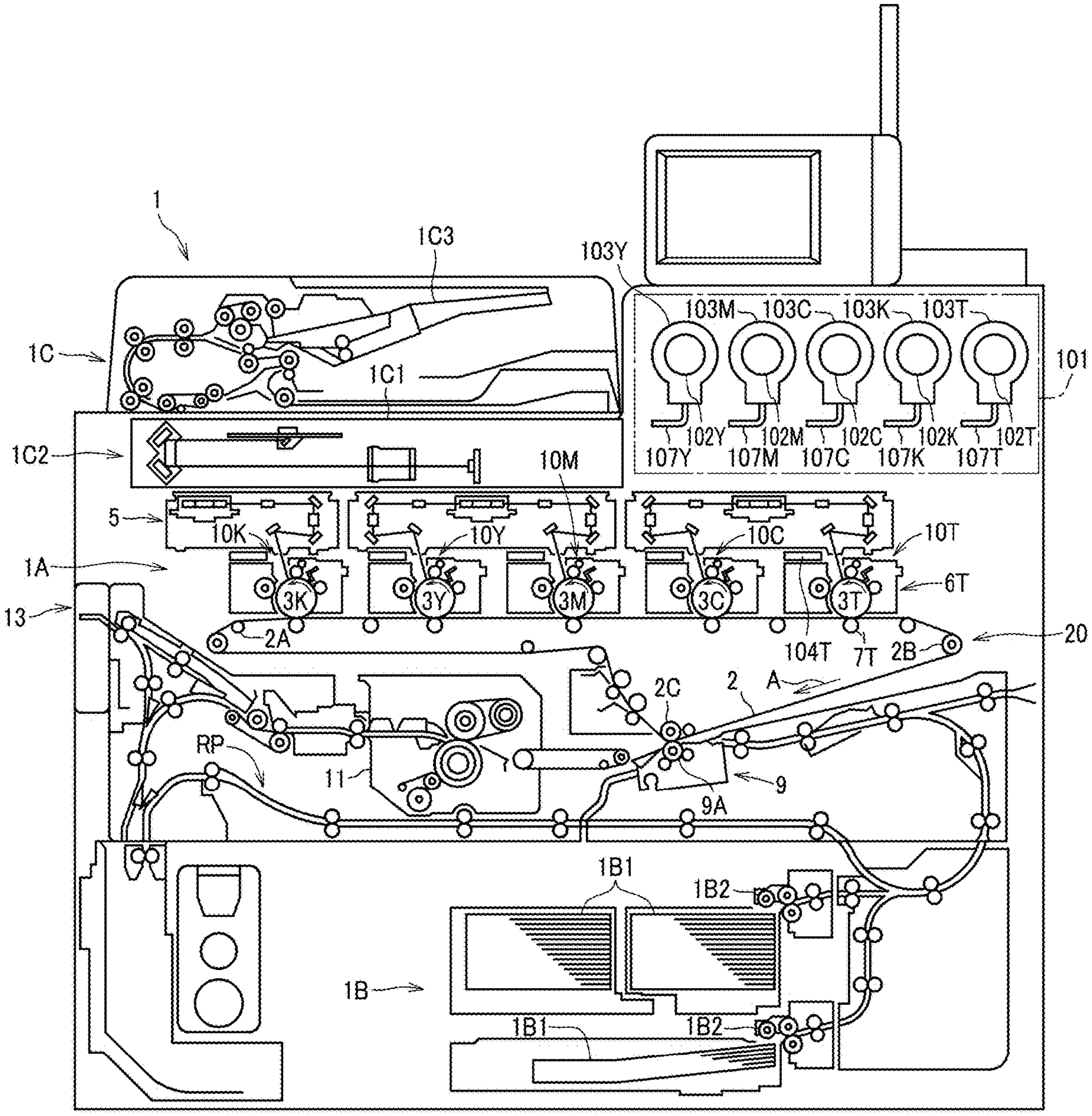
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings in the following description. In the drawings, like reference signs denote like or equivalent components and overlapping description of those components may be simplified or omitted as appropriate.

FIG. 1 is a diagram illustrating a configuration of an image forming apparatus 1 according to an embodiment of the present disclosure. The image forming apparatus 1 illustrated in FIG. 1 is a tandem-type color printer in which multiple photoconductors as latent image bearers are arranged in parallel. Each of the photoconductors provided for the image forming apparatus 1 can form a toner image in a color corresponding to a color separation component of a color image using toner as developer supplied from a developing device. After the toner images formed on the photoconductors are superimposed and transferred to an intermediate transfer device, the superimposed images are collectively transferred to a sheet such as a recording sheet. By so doing, a multicolor image can be formed on the sheet. In embodiments of the present disclosure, the image forming apparatus 1 is not limited to a color printer. However, the image forming apparatus 1 may be, for example, a color copier, a facsimile apparatus, or a printer.

As illustrated in FIG. 1, the image forming apparatus 1 includes an image former 1A in a center portion of the image forming apparatus 1 in the vertical direction, a sheet feeder 1B below the image former 1A, and a document scanner 1C including a document loading table 1C1 above the image former 1A. The image former 1A includes an intermediate transfer belt 2 as a belt. The intermediate transfer belt 2 has a stretched surface in a horizontal direction. The image forming apparatus 1 includes components that form images in colors complementary to color separation colors above the intermediate transfer belt 2. A transfer belt that transfers an image, which serves as a belt according to an embodiment of the present disclosure, is provided for the image forming apparatus 1. The intermediate transfer belt 2 of the present embodiment is an example of the transfer belt. However, the belt according to embodiments of the present disclosure is not limited to the intermediate transfer belt 2 as an intermediate transferor. For example, the belt according to embodiments of the present disclosure may be a conveyance belt to convey a recording median and form a transfer nip between a photoconductor and the conveyance belt.

In the image former 1A, image forming devices 10K, 10C, 10M, 10Y and 10T are arranged. The image forming devices 10K, 10C, 10M, and 10Y can form images with toners of colors of yellow, magenta, cyan, and black, respectively, in a complementary color relation. The image forming device 10T forms a glossy image with transparent toner. In the image forming devices 10K, 10C, 10M, 10Y, and 10T, photoconductors 3K, 3C, 3M, 3Y, and 3T, respectively, that can bear images are arranged in parallel along the stretched surface of the intermediate transfer belt 2. The photoconductor 3T bears an image of transparent toner. In the following description, the photoconductors 3K, 3C, 3M, 3Y, and 3T may be referred to simply as photoconductor(s) 3 in a case in which a similar description applies to all the photoconductors 3K, 3C, 3M, 3Y and 3T.

Each of the multiple photoconductors 3K, 3C, 3M, 3Y, and 3T is made of a drum rotatable in the same direction, which is a counterclockwise direction in FIG. 1. Around each of the photoconductors 3K, 3C, 3M, 3Y, and 3T, a charger, a writing device 5, a developing device 6, a primary transfer roller 7 as a primary transferor, and a cleaner are arranged. The photoconductor 3, the charger, the writing device 5, the developing device 6, the primary transfer roller 7, and the cleaner collectively perform image forming processing when the photoconductor 3 rotates. For the sake of convenience, a developing device 6T and a primary transfer roller 7T provided for the photoconductor 3T includes the reference sign T.

A transfer device 20 includes the intermediate transfer belt 2, the primary transfer rollers 7K, 7Y, 7M, 7C, and 7T (see FIG. 2) as primary transferors, and multiple rollers 2A and 2B, and a secondary-transfer backup roller 2C. In FIG. 1, only the primary transfer roller 7T is illustrated with the reference sign for the sake of convenience.

Toner images formed in the image forming devices 10K, 10C, 10M, 10Y, and 10T including the photoconductors 3K, 3C, 3M, 3Y and 3T, respectively, are sequentially transferred to the intermediate transfer belt 2. The intermediate transfer belt 2 is stretched around the rollers 2A and 2B, the secondary-transfer backup roller 2C, and multiple rollers that are not denoted with reference numerals in FIG. 1, to rotate in a direction indicated by arrow A in FIG. 1. The intermediate transfer belt 2 faces the photoconductors 3K, 3C, 3M, 3Y, and 3T at multiple positions. The rollers 2A and 2B stretch the intermediate transfer belt 2 at two positions outer than the multiple positions in the direction of rotation of the intermediate transfer belt 2. The secondary-transfer backup roller 2C faces the secondary transfer device 9 with the intermediate transfer belt 2 interposed between the secondary-transfer backup roller 2C and the secondary transfer device 9.

The secondary transfer device 9 includes a secondary transfer roller 9A. The secondary transfer roller 9A forms a secondary transfer nip at a position at which the secondary transfer roller 9A presses against the secondary-transfer backup roller 2C with the intermediate transfer belt 2 interposed between the secondary transfer roller 9A and the secondary-transfer backup roller 2C. A secondary transfer bias having the same polarity as the polarity of toner is applied to the secondary-transfer backup roller 2C. On the other hand, the secondary transfer roller 9A is grounded. Accordingly, a secondary transfer electric field is formed at the secondary transfer nip to electrostatically move a multicolor toner image on the intermediate transfer belt 2 from the intermediate transfer belt 2 toward the secondary transfer roller 9A. The multicolor toner image is transferred onto a sheet conveyed to the secondary transfer nip at the secondary transfer nip.

A recording sheet is fed to the secondary transfer nip from the sheet feeder 1B. The sheet feeder 1B includes multiple sheet feed trays 1B1 and multiple conveyance rollers 1B2.

The multiple conveyance rollers 1B2 are disposed on a conveyance path of recording sheets fed from the sheet feed trays 1B1.

The photoconductors 3K, 3C, 3M, 3Y, and 3T are irradiated with writing light by the writing devices 5, and electrostatic latent images corresponding to image data are formed on the photoconductors 3K, 3C, 3M, 3Y, and 3T. The image data is obtained by scanning a document on the document loading table 1C1 disposed in the document scanner 1C, or by image data output from a computer.

The document scanner 1C includes a scanner 1C2 and an automatic document feeder 1C3. The scanner 1C2 exposes and scans a document on the document loading table 1C1. The automatic document feeder 1C3 is disposed above an upper surface of the document loading table 1C1. The automatic document feeder 1C3 inverts a document fed onto the document loading table 1C1 to scan front and back sides of the document.

Each of the electrostatic latent images on the photoconductors 3K, 3C, 3M, 3Y and 3T formed by the writing devices 5 is subjected to visual image processing by the corresponding one of the developing devices 6K, 6C, 6M, 6Y, and 6T and primarily transferred to the intermediate transfer belt 2. The developing device 6T is illustrated with the reference sign in FIG. 1 for the sake of convenience. After toner images of black, yellow, cyan, magenta, and transparent colors are superimposed and transferred onto the intermediate transfer belt 2, the toner images are secondarily transferred onto a recording sheet collectively by the secondary transfer device 9.

The multicolor image to be fixed, which is borne on the surface of the recording sheet on which the secondary transfer has been performed, is fixed by the fixing device 11. The fixing device 11 has a belt fixing structure that includes a fixing belt heated by a heating roller and a pressure roller facing and in contact with the fixing belt. In such a configuration, a contact area, i.e., a nip area is disposed between the fixing belt and the pressure roller, thus allowing an area in which the recording sheet is heated to be increased as compared with a heat-roller fixing structure.

A conveyance direction of the recording sheet that has passed through the fixing device 11 can be switched by a conveyance-path switching claw disposed in a rear portion of the fixing device 11. Specifically, the conveyance direction of the recording sheet is selected between the conveyance path directed to a sheet ejector 13 and a reverse conveyance path RP by the conveyance-path switching claw.

In the image forming apparatus 1 having the above-described configuration, electrostatic latent images are formed on the uniformly charged photoconductors 3K, 3C, 3M, 3Y, and 3T by exposure scanning of a document placed on the document loading table 1C1 or by reading image data from a computer. Subsequently, the electrostatic latent images are subjected to visual image processing by the developing devices 6K, 6C, 6M, 6Y and 6T. Then, the toner images are primarily transferred to the intermediate transfer belt 2.

In the case of a single-color image, a toner image that has been transferred to the intermediate transfer belt 2 is transferred onto a recording sheet fed from the sheet feeder 1B as is. In the case of a multicolor image, primary transfer is repeated such that toner images are superimposed one on another. Then, the toner images are secondarily transferred to the recording sheet collectively. The unfixed image that has been secondarily transferred onto the recording sheet is fixed by the fixing device 11. Then, the recording sheet is fed to the sheet ejector 13 or reversed and fed again to the secondary transfer nip.

In FIG. 1, the intermediate transfer belt 2 is formed of, for example, a single layer or multiple layers of polyvinylidene fluoride (PVDF), ethylene-tetrafluoroethylene, copolymer (ETFE), polyimide (PI), or polycarbonate (PC). A conductive material such as carbon black is dispersed in the intermediate transfer belt 2. The intermediate transfer belt 2 is adjusted to have a volume resistivity in a range of $10^8$ to $10^{12}$ Ωcm and a surface resistivity in a range of $10^9$ to $10^{13}$ Ωcm. The surface of the intermediate transfer belt 2 may be coated with a release layer as needed. Examples of the material employed for coating the intermediate transfer belt 2 include fluororesins such as ethylene-tetrafluoroethylene copolymer (ETFE), polytetrafluoroethylene (PTFE), polyvinylidene fluoride (RV/DP), perfluoroalkoxy fluororesin (PFA), tetrafluoroethylene-hexafluoropropylene copolymer (FEP), and vinyl fluoride (PVF). However, the materials employed for coating the intermediate transfer belt 2 are not limited to the above-described fluororesins. Examples of the method for producing the intermediate transfer belt 2 include a casting method and a centrifugal molding method. The surface of the intermediate transfer belt 2 may be polished as needed. When the volume resistivity of the intermediate transfer belt 2 exceeds the above-described range, the bias needed to transfer a toner image onto a recording sheet increases. Accordingly, the cost of a power source for the intermediate transfer belt 2 increases. For this reason, such a configuration of the intermediate transfer belt 2 is not preferable. Further, the charging potential of the intermediate transfer belt 2 increases in, for example, a transfer process or a transfer-sheet peeling process. Accordingly, self-discharge of the intermediate transfer belt 2 may be difficult. For this reason, an electric discharger is needed. In addition, when the volume resistivity and the surface resistivity of the intermediate transfer belt 2 are lower than the above-described ranges, attenuation of the charging potential is fast, which is advantageous for electrically discharging the intermediate transfer belt 2 due to self-discharge. However, an electric current at the time of transfer flows in a plane direction of the surface of the intermediate transfer belt 2. Accordingly, toner scattering may occur. For this reason, the volume resistivity and the surface resistivity of the intermediate transfer belt 2 according to the present embodiment are preferably set within the ranges described above. For the measurement of the volume resistivity and the surface resistivity of the intermediate transfer belt 2, a high-resistance resistivity meter (Hiresta-IP, registered trademark, manufactured by Mitsubishi Chemical Corporation) was connected to a high resistance state (HRS) probe having the inner electrode diameter of 5.9 mm and the ring-electrode inner-diameter of 11 mm. A voltage of 100 V with the surface resistivity of 500 V was applied to the front and back surfaces of the intermediate transfer belt 2. A measured value after 10 seconds from a time at which the voltage of 100 V with the surface resistivity of 500 V was applied was employed.

The intermediate transfer belt 2 is stretched around at least the roller 2A and the roller 2B as a roller pair and the secondary-transfer backup roller 2C disposed at the secondary transfer position. The roller 2A as a driving roller is set to rotate clockwise such that the intermediate transfer belt 2 moves in the direction indicated by arrow A illustrated inside the intermediate transfer belt 2 in FIG. 1. The surface of the intermediate transfer belt 2, on which the toner images are transferred, moving between the roller 2A and the roller 2B faces the photoconductors 3K, 3Y, 3C, 3M, and 3T of the image forming devices 10K, 10C, 10M, 10Y, and 10T, respectively. The primary transfer rollers 7K, 7Y, 7M, 7C, and 7T serve as primary transferors for electrostatically transferring visible images on the respective photoconductors 3 to the intermediate transfer belt 2. The primary transfer rollers 7K, 7Y, 7M, 7C, and 7T are disposed at positions at which the primary transfer rollers 7K, 7Y, 7M, 7C, and 7T face the photoconductors 3K, 3C, 3M, 3Y, and 3T, respectively, via the intermediate transfer belt 2. The primary transfer roller 7T is illustrated with the reference sign in FIG. 1 for the sake of convenience.

The primary transfer rollers 7K, 7Y, 7M, 7C, and 7T according to the present embodiment are cored bars made of metal such as iron, steel use stainless (SUS), or aluminum (Al) coated with foam resin. The foam resin has a wall thickness of 2 mm to 10 mm. Known blade-shaped or brush-shaped transferors may also be employed as the transferors.

In the present embodiment, white toner is employed for the purpose of forming a white base color for an image in addition to toner employed for full-color image formation. In addition, transparent toner may be employed for the purpose of improving glossiness and transferability of an image, and, for example, light cyan toner or light magenta toner may be selected for increasing a color gamut. For the purpose of creating a colored metal color such as a red copper color and a bronze color, toner of a metal color such as gold toner and silver toner may also be employed as a base.

Figure 2A:
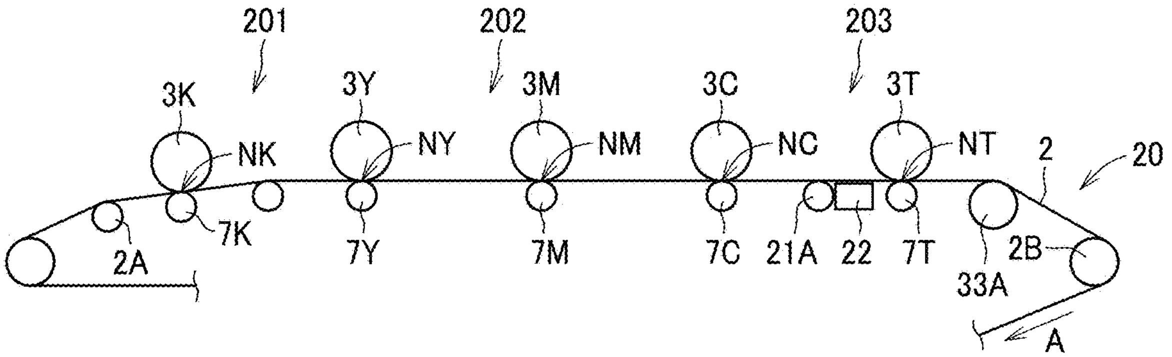
FIGS. 2A and 2B are schematic diagrams illustrating a configuration of a transfer device according to an embodiment of the present disclosure.

As illustrated in FIG. 2A, the primary transfer roller 71 and the photoconductor 31 form a special color transfer nip NT with the intermediate transfer belt 2 interposed between the primary transfer roller 7T and the photoconductor 3T. The primary transfer roller 7C and the photoconductor 3C form a cyan transfer nip NC with the intermediate transfer belt 2 interposed between the primary transfer roller 7C and the photoconductor 3C. The primary transfer roller 7M and the photoconductor 3M form a magenta transfer nip NM with the intermediate transfer belt 2 interposed between the primary transfer roller 7M and the photoconductor 3M. The primary transfer roller 7Y and the photoconductor 3Y form a yellow transfer nip NY with the intermediate transfer belt 2 interposed between the primary transfer roller 7Y and the photoconductor 3Y. The primary transfer roller 7K and the photoconductor 3K form a black transfer nip NK with the intermediate transfer belt 2 interposed between the primary transfer roller 7K and the photoconductor 3K.

The transfer device 20 includes a most-upstream primary transfer section 201 disposed most upstream in the rotation direction of the intermediate transfer belt 2, a most-downstream primary transfer section 203 disposed most downstream in the rotation direction of the intermediate transfer belt 2, and a central primary transfer section 202 including the multiple primary transfer rollers 7Y, 7M, and 7C disposed between the most-upstream primary transfer section 201 and the most-downstream primary transfer section 203. In the present embodiment, the most-upstream primary transfer section 201 transfers a black toner image at the black transfer nip NK, the central primary transfer section 202 transfers a cyan toner image at the cyan transfer nip NC, a magenta toner image at the magenta transfer nip NM, and a yellow toner image at the yellow transfer nip NY to the intermediate transfer belt 2. The most-downstream primary transfer section 203 transfers a special color toner image at the special color transfer nip NT to the intermediate transfer belt 2. In the following description, the term "upstream in the rotation direction of the intermediate transfer belt 2" or "downstream in the rotation direction of the intermediate transfer belt 2" may also be referred to simply as upstream or downstream.

In FIG. 2A, the primary transfer roller 7K disposed in the most-upstream primary transfer section 201 is a most-upstream primary transferor, the primary transfer rollers 7Y, 7M, and 7C disposed in the central primary transfer section 202 are central primary transferors, and the primary transfer roller 7T disposed in the most-downstream primary transfer section 203 is a most-downstream primary transferor. The rotation direction of the intermediate transfer belt 2 is a direction indicated by arrow A in FIG. 2A.

In the present embodiment, a toner image of the special color can be transferred to the intermediate transfer belt 2 in any of the most-upstream primary transfer section 201 and the most-downstream primary transfer section 203. Accordingly, a toner image of the special color can be transferred in a desired order.

Between the primary transfer roller 7C and the primary transfer roller 7T in the rotation direction of the intermediate transfer belt 2, a driven roller 21A as a second tension roller and a sensor 22 as a sensor are disposed. The driven roller 21A stretches the intermediate transfer belt 2. The sensor 22 detects a scale on the intermediate transfer belt 2 and detects the rotation speed of the intermediate transfer belt 2. Controlling the rotation speed of the intermediate transfer belt 2 based on the detection result of the sensor 22 prevents the positional shift of toner images of the colors to be transferred to the intermediate transfer belt 2.

Figure 2B:
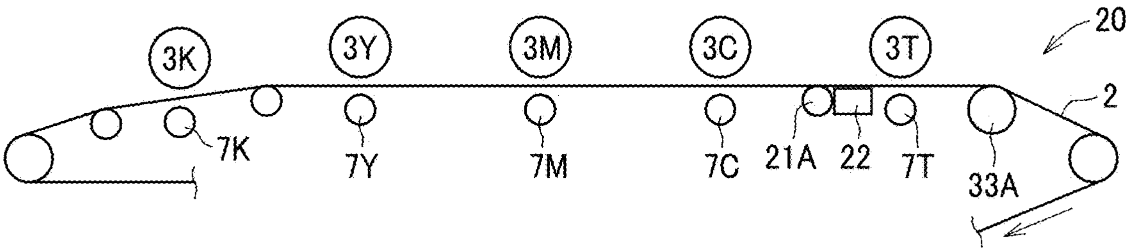

In the transfer device 20 according to the present embodiment, the multiple primary transfer rollers 7K, 7Y, 7M, 7C, and 7T contact with and separate from the photoconductors 3K, 3Y, 3M, 3C, and 3T, respectively, with the intermediate transfer belt 2 interposed between the primary transfer rollers 7K, 7Y, 7M, 7C, and 7T and the photoconductors 3K, 3Y, 3M, 3C, and 3T, respectively, in accordance with modes of image formation. For example, as illustrated in FIG. 2B, all of the primary transfer rollers 7K, 7Y, 7M, 7C, and 7T can be separated from the photoconductors 3K, 3Y, 3M, 3C, and 3T, respectively. FIG. 2B is a diagram illustrating a configuration in which the primary transfer roller 7K of the most-upstream primary transfer section 201, the primary transfer rollers 7Y, 7M, and 7C of the central primary transfer section 202, and the primary transfer roller 7T of the most-downstream primary transfer section 203 can be switched between the contact positions and the separation positions.

In conjunction with the operation of the primary transfer roller 7T as the most-downstream primary transferor in which the primary transfer roller 7T moves toward or away from the photoconductor 3T, the driven rollers 21A and 33A that serve as stretching members to stretch the intermediate transfer belt 2 and the sensor 22 also move in a direction in which the driven rollers 21A, 33A, and the sensor 22 move toward and away from the photoconductor 3T, which is the vertical direction in FIG. 2B. A first moving assembly 91 that causes the primary transfer roller 7T, the driven roller 21A, and the driven roller 33A to move toward and away from the photoconductor 3T is described in the following description. The following description describes a case in which a toner image of a special color is transferred by the primary transfer roller 7T of the most-downstream primary transfer section 203. However, a toner image of black color may be transferred by the primary transfer roller 7T of the most-downstream primary transfer section 203.

Figure 3:
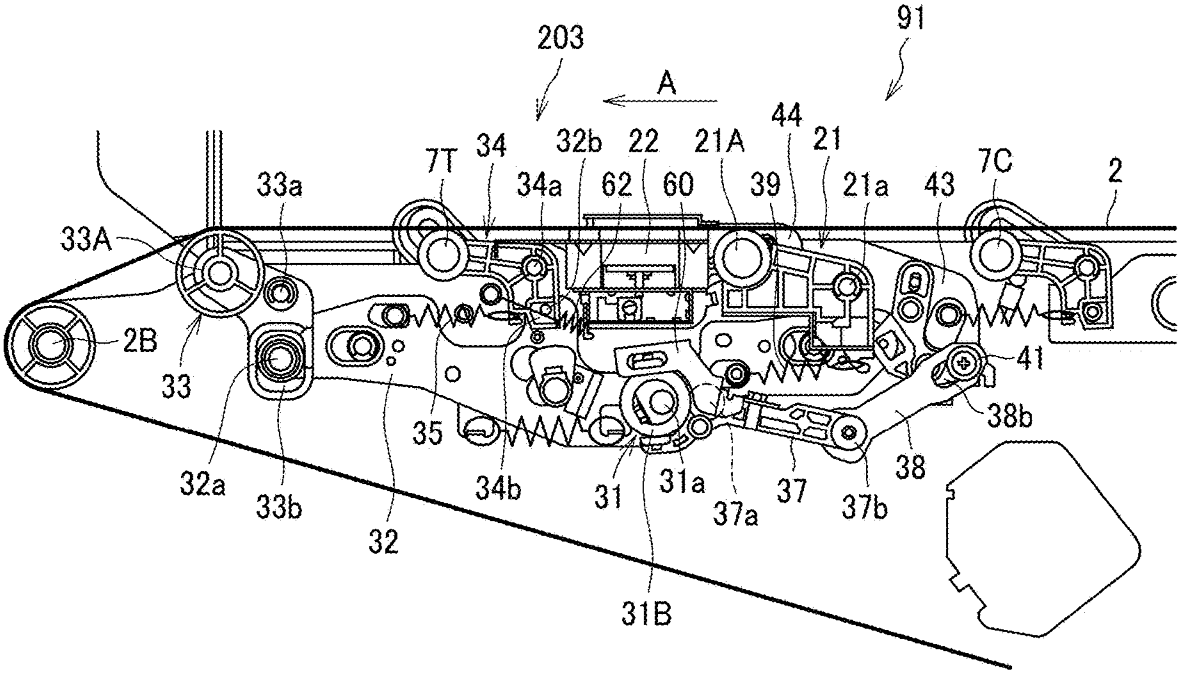
FIG. 3 is a cross-sectional view of a moving assembly viewed from the rear side of the image forming apparatus of FIG. 1, in which a primary transfer roller of a most-downstream primary transfer section is arranged at a contact position relative to an intermediate transfer belt, according to an embodiment of the present disclosure.

FIG. 3 is a cross-sectional view of the first moving assembly 91 viewed from the rear side of the image forming apparatus 1 which is an opposite side of the sheet surface of, for example, FIG. 1, and is a diagram illustrating a case in which the primary transfer roller 7T contacts the photoconductor 3T via the intermediate transfer belt 2.

As illustrated in FIG. 3, the primary transfer roller 7T is disposed at one end of a rotating arm 34. The rotating arm 34 is rotatable about a rotation shaft 34*a*. The rotating arm 34 includes a hole 34*b* at an end of the rotating arm 34 opposite to another end of the rotating arm 34 on which the primary transfer roller 71 is disposed. A pin 32*b* disposed on the front slider 32 is inserted into the hole 34*b*. A spring 35 that serves as a biasing member is fixed to a housing of the image forming apparatus 1 and biases the rotating arm 34 in a direction in which the rotating arm 34 rotates clockwise in FIG. 3 about the rotation shall 34*a*. The biasing force of the spring 35 causes the primary transfer roller 7T to contact the intermediate transfer belt 2. The driven roller 33A, which is one of tension members around which the intermediate transfer belt 2 is stretched, is disposed at one end of a rotator 33. The rotator 33 is rotatable about a rotation fulcrum 33*a*. The rotator 33 includes a hole 33*b* at an end of the rotator 33 opposite to another end of the rotator 33 on which the driven roller 33A is disposed. An insertion portion 32*a* disposed on the front slider 32 inserts into the hole 33*b*. The insertion portion 32*a* is formed by press-fitting a ball bearing into a shaft fixed to the front slider 32. The driven roller 21A is disposed at one end of the rotator 21. The rotator 21 is rotatable about a rotation fulcrum 21*a*. The rotator 21 receives a force from a spring 39 acting in a direction such that the rotator 21 rotates clockwise in FIG. 3 about the rotation fulcrum 21*a*.

Figure 4:
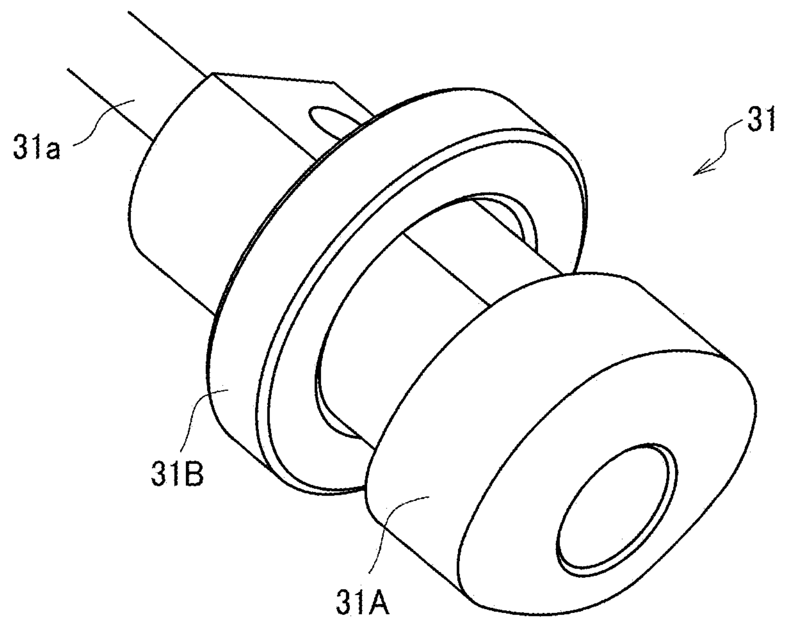
FIG. 4 is a perspective view of a cam according to an embodiment of the present disclosure.

The first moving assembly 91 includes a cam 31 to which the driving force of a motor is transmitted. As illustrated in FIG. 4, the cam 31 includes a first cam 31A and a second cam 31B and is rotatable about a rotational axis 31*a*.

Figure 5:
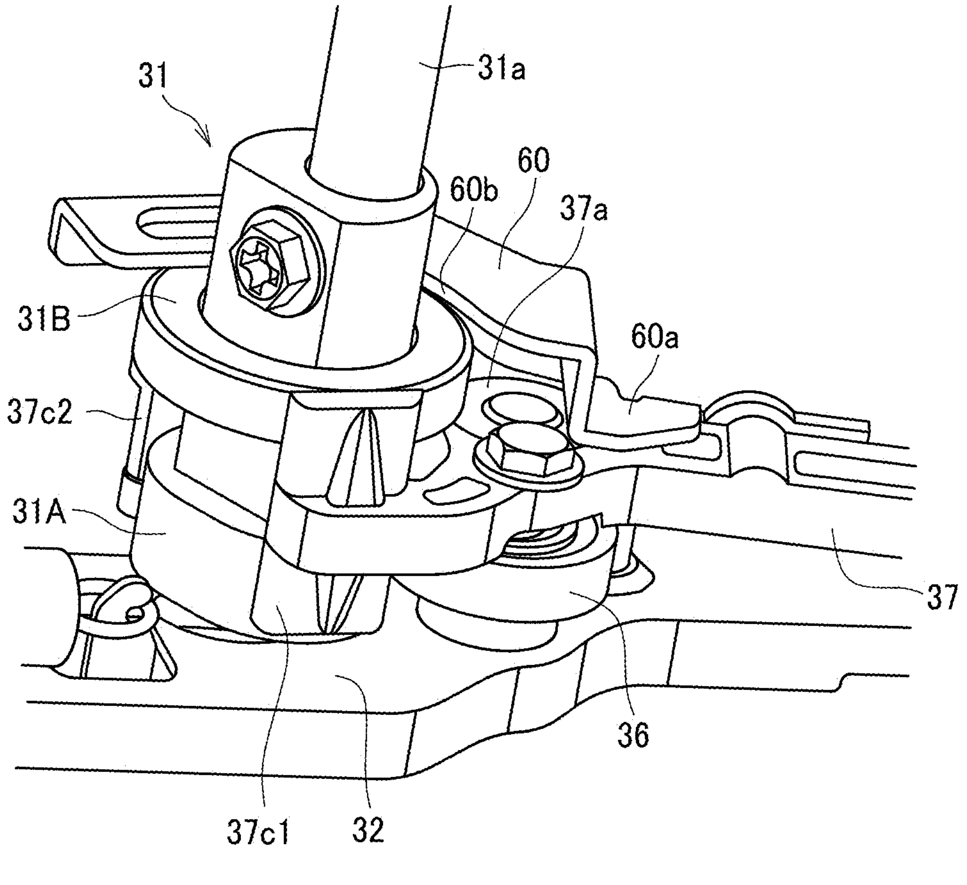
FIG. 5 is a perspective view of the cam of FIG. 4 and components around the cam viewed from the rear side of FIG. 4, according to an embodiment of the present disclosure.

The first cam 31A includes a small-diameter portion, a medium-diameter portion, and a large-diameter portion each having a different diameter by 120 degrees. As illustrated in FIG. 5, the first cam 31A is in contact with a cam follower 36 formed of a ball bearing. Rotation of the first cam 31A changes the surface of the first cam 31A that contacts the earn follower 36. By so doing, the front slider 32 can be moved in the left-right direction in FIG. 3.

Figure 6:
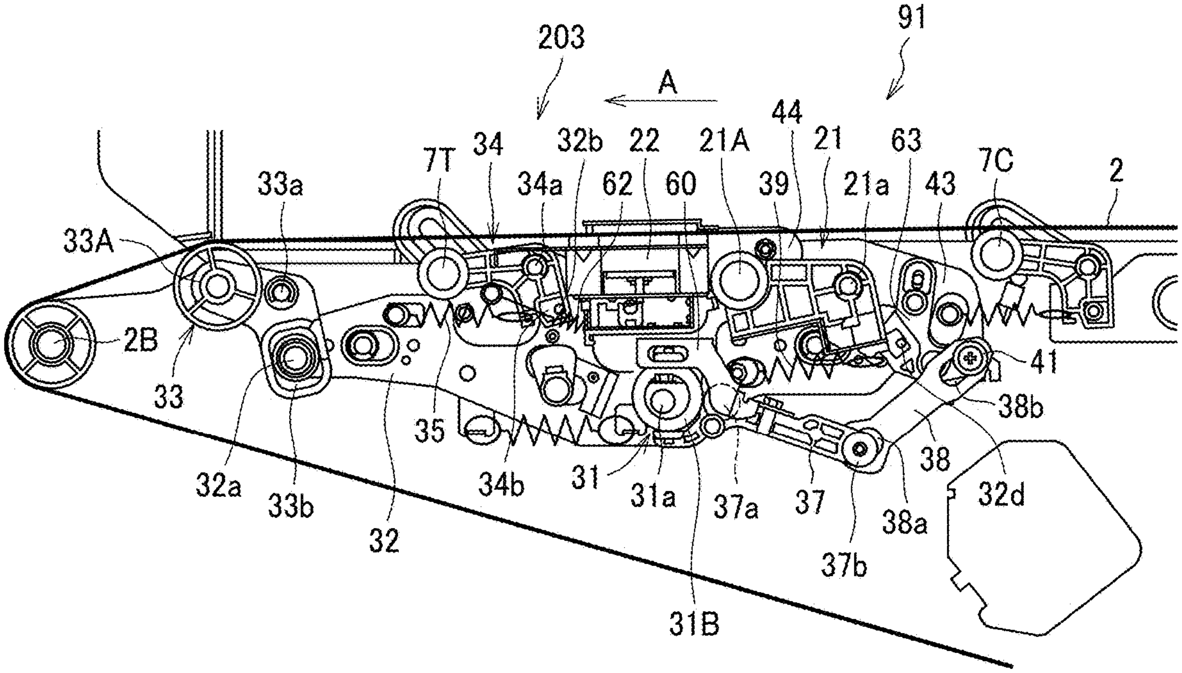
FIG. 6 is a cross-sectional view of the moving assembly of FIG. 3 viewed from the rear side of the image forming apparatus of FIG. 1, in which the primary transfer roller of the most-downstream primary transfer section is arranged at a separation position relative to the intermediate transfer belt.

FIG. 6 is a cross-sectional view of the first moving assembly 91 viewed from the rear side of the image forming apparatus 1, illustrating a case in which the primary transfer roller 7T is separated from the photoconductor 3T.

Rotation of the first cam 31A causes the front slider 32 to move further in the right direction than the position of the front slider 32 in FIG. 3. By so doing, the primary transfer roller 7T is separated from the photoconductor 3T. In other words, when the front slider 32 moves in the right direction from the position of the front slider 32 in FIG. 3 to the position of the front slider 32 in FIG. 6, the insertion portion 32*a*, the pin 32*b*, and a pin 32*c* disposed in the front slider 32 press the rotator 33, the rotating arm 34, and the rotator 21, respectively. Accordingly, the rotator 33, the rotating arm 34, and the rotator 21 rotate counterclockwise. As a result, the driven roller 33A, the primary transfer roller 7T, and the driven roller 21A move downward in FIG. 6, that is, in a direction away from the photoconductor 3T. When the driven roller 33A and the driven roller 21A move as described above, the positions at which the intermediate transfer belt 2 is stretched by the driven roller 33A, the primary transfer roller 7T, and the driven roller 21A move downward in FIG. 6. Further, when the cam 31 rotates from a position of the cam 31 in FIG. 6 to a position of the cam 31 in FIG. 3, the rotators 33 and 21 and the rotating arm 34 rotate clockwise in FIG. 6 by the biasing force of the respective springs and return to the respective positions in FIG. 3.

A second moving assembly 92 as a second movement mechanism and a third moving assembly 93 as a third movement mechanism are described below with reference to FIG. 7. The second moving assembly 92 causes the primary transfer rollers 7C, 7M, and 7Y disposed in the central primary transfer section 202 to contact with and separate from the intermediate transfer belt 2. The third moving assembly 93 causes the primary transfer roller 7K disposed in the most-upstream primary transfer section 201 to contact with and separate from the intermediate transfer belt 2.

Figure 7:
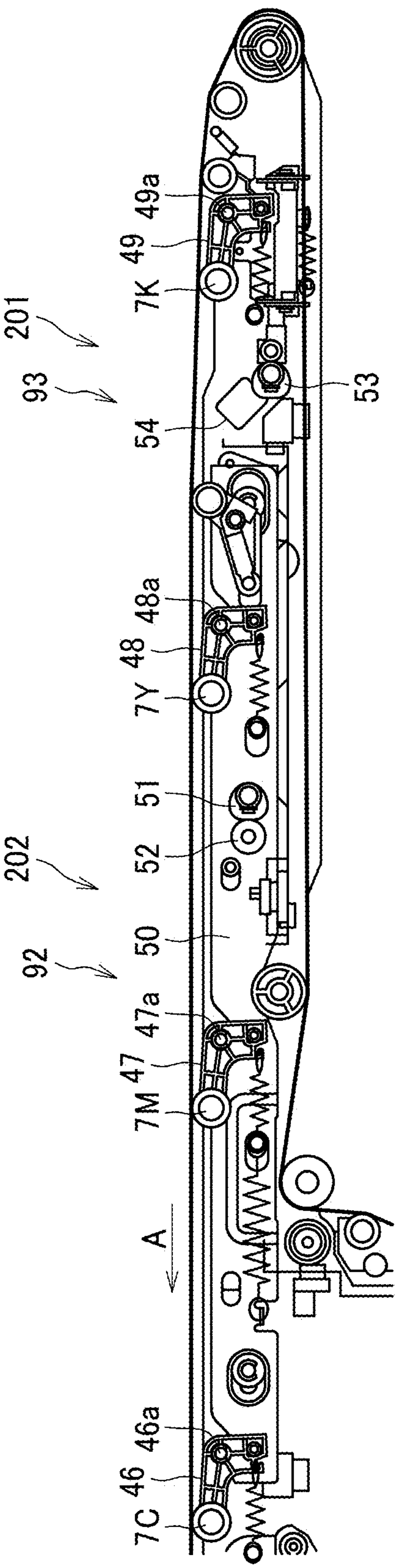
FIG. 7 is a cross-sectional view of a moving assembly to cause a central primary transfer section and a most-upstream primary transfer section to contact with and separate from an intermediate transfer belt, according to an embodiment of the present disclosure.

As illustrated in FIG. 7, the second moving assembly 92 includes rotators 46, 47, and 48, a cam 51, and a cam follower 52. The third moving assembly 93 includes a rotator 49, a cam 53, and a cam follower 54. The second moving assembly 92 includes a motor as a driving source to rotate the cam 51, and the third moving assembly 93 includes a motor as a driving source to rotate the cam 53.

The rotators 46, 47, 48, and 49 are rotatable about the rotation fulcrums 46*a*, 47*a*, 48*a*, and 49*a*, respectively. The primary transfer roller 7C is disposed at one end of the rotator 46. The primary transfer roller 7M is disposed at one end of the rotator 47. The primary transfer roller 7Y is disposed at one end of the rotator 48. The primary transfer roller 7K is disposed at one end of the rotator 49. The rotators 46, 47, 48, and 49 are biased by springs to rotate clockwise in FIG. 7 and cause the primary transfer rollers 7C, 7M, 7Y, and 7K, respectively, to contact the photoconductors 3C, 3M, 3Y, and 3K, respectively, via the intermediate transfer belt 2.

The cam follower 52 rotates by the rotation of the cam 51 to move a front slider 50 of the most-upstream primary transfer section 201 in the right direction in FIG. 7. Accordingly, one end of each of the rotators 46, 47, and 48 opposite to another end at which the corresponding one of the primary transfer rollers 7C, 7M, and 7Y is disposed is pressed. Accordingly, the rotators 46, 47, and 48 rotate counterclockwise in FIG. 7 against the biasing force of the springs. Accordingly, the primary transfer rollers 7C, 7M, and 7Y move away from the photoconductor 3C, 3M, and 3Y, respectively. Further, the rotation of the cam 53 causes the cam follower 54 to rotate, and one end of the rotator 49 opposite to another end of the rotator 49 at which the primary transfer roller 7K is disposed is pressed. Accordingly, the rotator 49 rotates counterclockwise in FIG. 7 against the biasing force of the spring, and the primary transfer roller 7K moves away from the photoconductor 3K. As described above, the primary transfer roller 7K of the most-upstream primary transfer section 201 and the primary transfer rollers 7C, 7M, and 7Y of the central primary transfer section 202 independently move toward and away from the photoconductor 3K, 3C, 3M, and 3Y, respectively.

A configuration in which the rotating arms 34 that hold the primary transfer roller 7T as a holder and cause the primary transfer roller 7T to move toward and away from the photoconductor 3T is described below in detail with reference to FIGS. 8, 9, 10, and 11. Both ends of the primary transfer roller 7T in an axial direction of the primary transfer roller 71 are held by the rotating arms 34. The rotating arm 34 disposed on one end of the primary transfer roller 7T in the axial direction illustrated in FIGS. 8 and 9 and on the rear side of the image forming apparatus 1 is referred to as rotating arm 34A. The rotating arm 34 disposed on another end of the primary transfer roller 7T in the axial direction illustrated in FIGS. 10 and 11 and on the front side of the image forming apparatus 1 is referred to as rotating arm 34B. The rotating arms 34A and 34B disposed in the most-downstream primary transfer section 203 to hold the primary transfer roller 7T are described below. However, rotating arms according to embodiments of the present disclosure are not limited to the rotating arms in the most-downstream primary transfer section.

Figure 8:
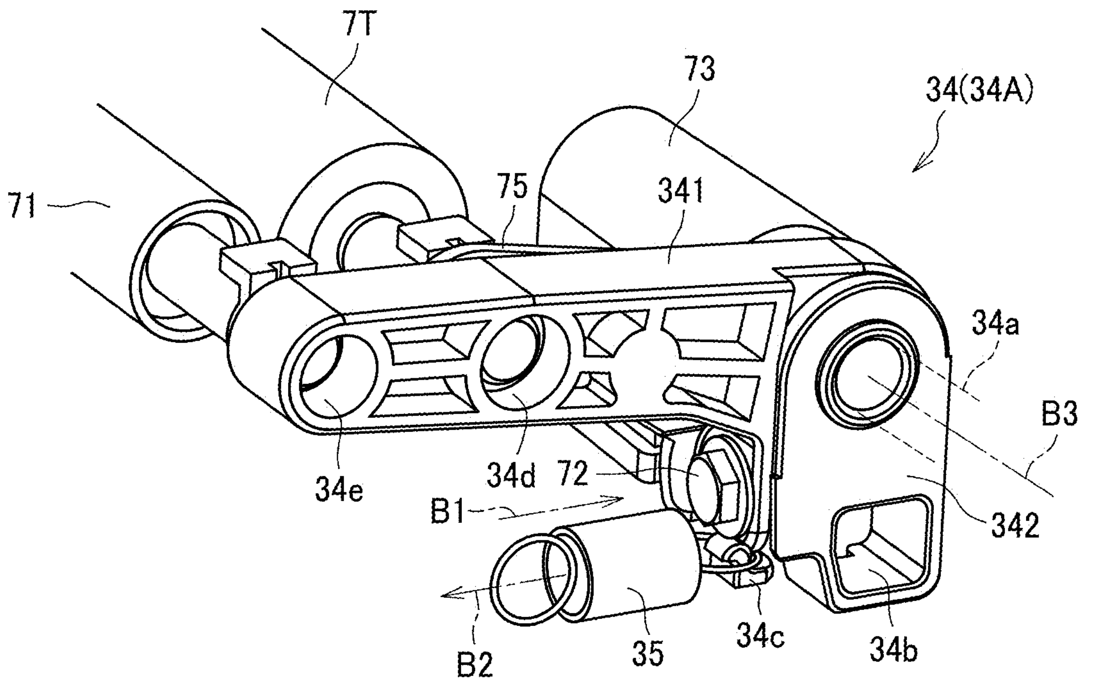
FIG. 8 is a perspective view of a rotating arm disposed on the rear side of the image forming apparatus of FIG. 1, according to an embodiment of the present disclosure.

As illustrated in FIG. 8, the rotating arm 34A includes a first portion 341 and a second portion 342. The first portion 341 has an insertion hole 34*d* through which the shaft of the primary transfer roller 7T is inserted and an insertion hole 34*e* through which the shaft of a backup roller 71 is inserted. The insertion hole 34*d* and a wall surface forming the insertion hole 34*d* form a holding part to hold the primary transfer roller 7T. The first portion 341 serves as a bearing of the primary transfer roller 7T. The second portion 342 includes an attachment portion 34*c* to which the spring 35 is attached. The second portion 342 also has a hole 34*b*. A wall surface forming the hole 34*b* serves as a contact portion with which the pin 32*b* (see FIG. 6) contacts. The pin 32*b* of the front slider 32 serves as a movement mechanism to rotate the rotating arm 34A in a direction opposite to a direction in which the spring 35 biases the rotating arm 34A to move the primary transfer roller 7T.

The backup roller 71 reduces vibration generated due to a step difference between the photoconductor 3T and the primary transfer roller 7T when the photoconductor 3T and the primary transfer roller 7T contact each other to form a primary transfer nip to transfer a toner image.

The first portion 341 is made of a non-conductive material. The second portion 342 is made of a material having a higher rigidity than the first portion 341. In the present embodiment, the first portion 341 is made of resin and the second portion 342 is made of a metal material.

The above-described material having a higher rigidity refers to a material that is less deformed when the same amount of force is applied to the material and another material. Metal materials are compared on the basis of the magnitude of the Young's modulus. Resin materials are compared on the basis of the magnitude of the flexural strength. Typically, among materials used for mechanical parts of an image forming apparatus, metal has a higher rigidity than resin material.

Figure 9:
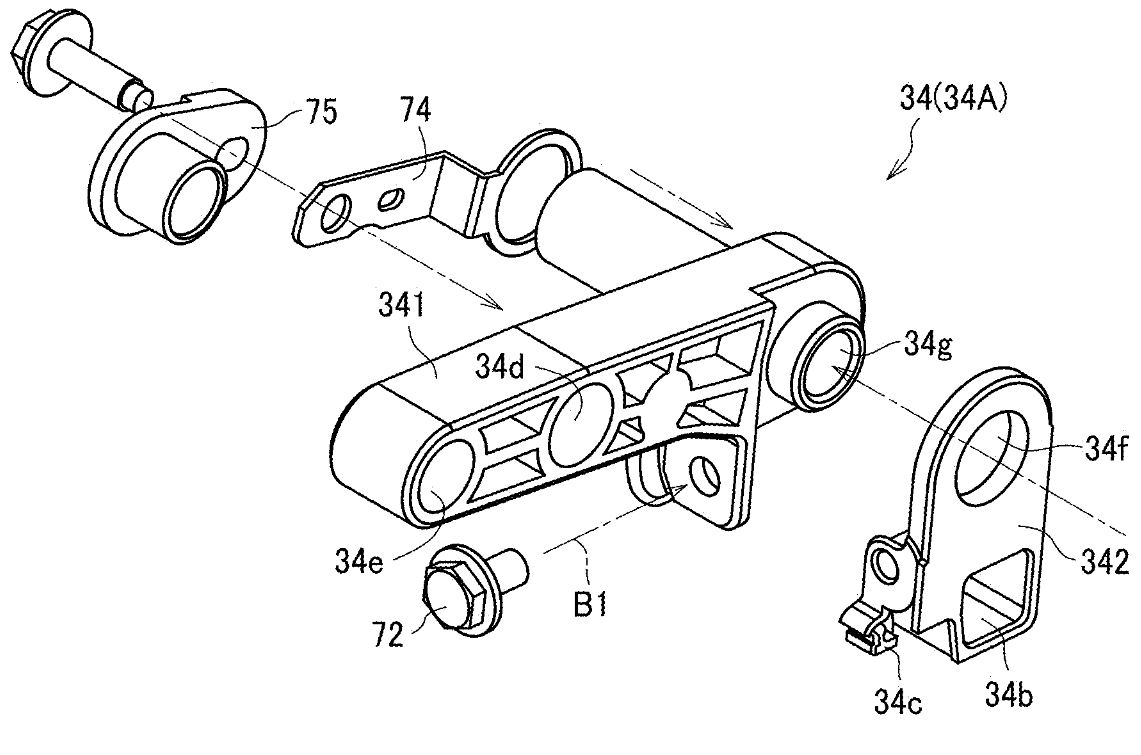
FIG. 9 is an exploded perspective view of the rotating arm of FIG. 8.

As illustrated in FIG. 9, a shaft hole 34*f* of the second portion 342 inserts into a cylindrical portion forming a shaft hole 34*g* of the first portion 341 to position the second portion 342 relative to the first portion 341. The rotation shaft 34*a* fixed to the housing of the image forming apparatus 1 is inserted into the shaft hole 34*g* and the shalt hole 34*f*. As described above, the first portion 341 and the second portion 342 are positioned coaxially with the rotation shaft 34*a* of the rotating arm 34. Accordingly, the first portion 341 and the second portion 342 can be assembled with precision and dimensional errors are unlikely to be accumulated. Accordingly, the positional accuracy of the rotating arm 34 relative to the pin 32*b* (see FIG. 6) can be enhanced. The rotation shaft 34*a* is in contact with only the first portion 341 and is not in contact with the second portion 342. The rotation shaft 34*a* does not slide on the second portion 342 having high rigidity. Accordingly, the slide load of the rotating arm 34 during rotation of the rotating arm 34 can be reduced.

A screw 72 that serves as a fastener is fastened to the first portion 341 and the second portion 342 that have been positioned. By so doing, the first portion 341 and the second portion 342 are assembled to each other. In the present embodiment, in particular, the second portion 342 having high rigidity includes a female screw portion with which the screw 72 is fastened. As a result, the screw 72 can be prevented from being disengaged.

A direction B1 in which the screw 72 is fastened illustrated in FIG. 8 is orthogonal to an axial direction B3 of the rotation shaft 34*a* of the rotating arm 34. Accordingly, a force is not applied in a direction in which the screw 72 is disengaged when the rotating arm 34 rotates about the rotation shaft 34*a*. As a result, the screw 72 can be prevented from being disengaged. The direction B1 in which the screw 72 is fastened is parallel to a direction B2 in which the spring 35 applies a biasing force to the rotating arm 34 and directed in a direction opposite to the direction B2. Accordingly, the biasing force of the spring 35 applied to the rotating arm 34 is not operated in a direction in which the screw 72 is disengaged. As a result, the screw 72 can be prevented from being disengaged. However, even if the direction B1 has some errors in the direction orthogonal to the axial direction B3 or in the direction parallel to the direction B2, a similar effect can be obtained.

A conductive path member 74 illustrated in FIG. 9 and a bias application mechanism 73 illustrated in FIG. 8 are attached to the second portion 342. The primary transfer roller 7T is attached to the second portion 342 via a bearing 75 illustrated in FIG. 9. One end of the path member 74 is in contact with the bias application mechanism 73 and another end of the path member 74 is attached to the hearing 75.

The bias application mechanism 73 can apply a primary transfer bias to the primary transfer roller 7T via the path member 74 and the bearing 75. The first portion 341 is formed of the non-conductive material. Accordingly, the primary transfer bias applied by the bias application mechanism 73 can be prevented from being transmitted to the metal transfer frame via the first portion 341. However, the entire first portion 341 does not need to be formed of a non-conductive material and it is only necessary to interrupt a conductive path between the transfer frame and a bias application path from the bias application mechanism 73 to the primary transfer roller 7T.

In the rotating arm 34 having such a configuration as described above, either when the primary transfer roller 7T is arranged at the contact position in FIG. 3 or when the primary transfer roller 7T is arranged at the separation position in FIG. 6, the spring 35 pulls the rotating arm 34 in a direction in which the rotating arm 34 rotates clockwise in FIG. 6. In other words, a tensile force of the spring 35 is constantly applied to the attachment portion 34*c* of the second portion 342. When the primary transfer roller 7T is arranged at the separation position in FIG. 6, a pressing force of the pin 32*b* is applied to a wall surface forming the hole 34*b* of the second portion 342. The above-described tensile force of the spring 35 may cause the rotating arm 34 to creep or to be deformed, and repeated changes of the posture of the rotating arm 34 may cause metal fatigue and fracture of the rotating arm 34.

On the other hand, in the present embodiment, the second portion 342 includes the contact portion with which the pin 32*b* (see FIG. 6) contact and the attachment portion 34*c* to which the spring 35 is attached. The second portion 342 is made of a material having a higher rigidity than the first portion 341. Accordingly, the creep of the rotating arm 34 due to the tensile force of the spring 35 and the metal fatigue and fracture of the rotating arm 34 due to repeated pressing of the pin 32*b* can be prevented. Further, in the rotating arm 34, a non-conductive member is disposed between the bias application mechanism 73 and the transfer frame such that the primary transfer bias may not be transferred to the transfer frame. Accordingly, forming the second portion 342 with a non-conductive material as in the present embodiment can prevent the primary transfer bias from being transmitted to the transfer frame. As described above, in the present embodiment, the rotating arm 34 includes the first portion 341 and the second portion 342. Each of the first portion 341 and the second portion 342 is formed of the material corresponding to a role assigned to the first portion 341 or the second portion 342. Thus, the primary transfer bias can be prevented from being transmitted to the transfer frame while damage to the rotating arm 34 is reduced. Further, a spring having a greater biasing force can be employed as the spring 35.

In the above description, the case has been described in which the second portion 342 as a single component includes the wall surface forming the attachment portion 34*c*, to which the spring 35 is attached, and the hole 34*b* serving as the contact portion, with which the pin 32*b* contacts. However, the attachment portion 34*c* and the hole 34*b* may be individual components and may be made of a material having a higher rigidity than the first portion 341. Further, the first portion 341 may be divided into multiple components, and the rotating arm 34 may include a portion having a higher rigidity than the attachment portion 34*c* and the contact portion.

Next, the rotating arm 34B disposed on the front side of the image forming apparatus 1 is described below.

Figure 10:
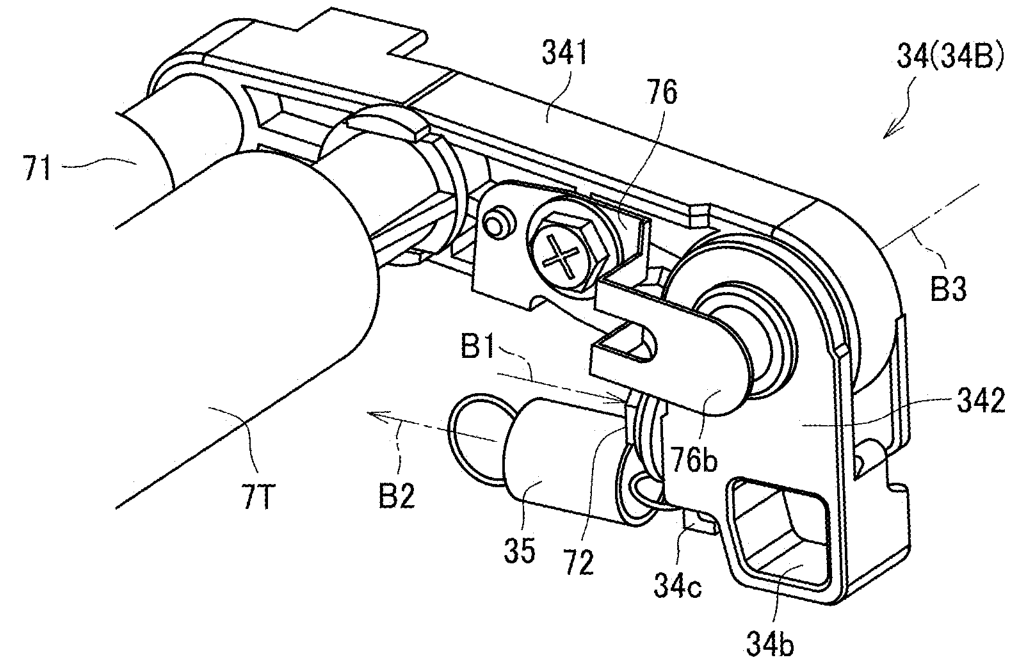
FIG. 10 is a perspective view of a rotating arm disposed on the front side of the image forming apparatus of FIG. 1, according to an embodiment of the present disclosure.
Figure 11:
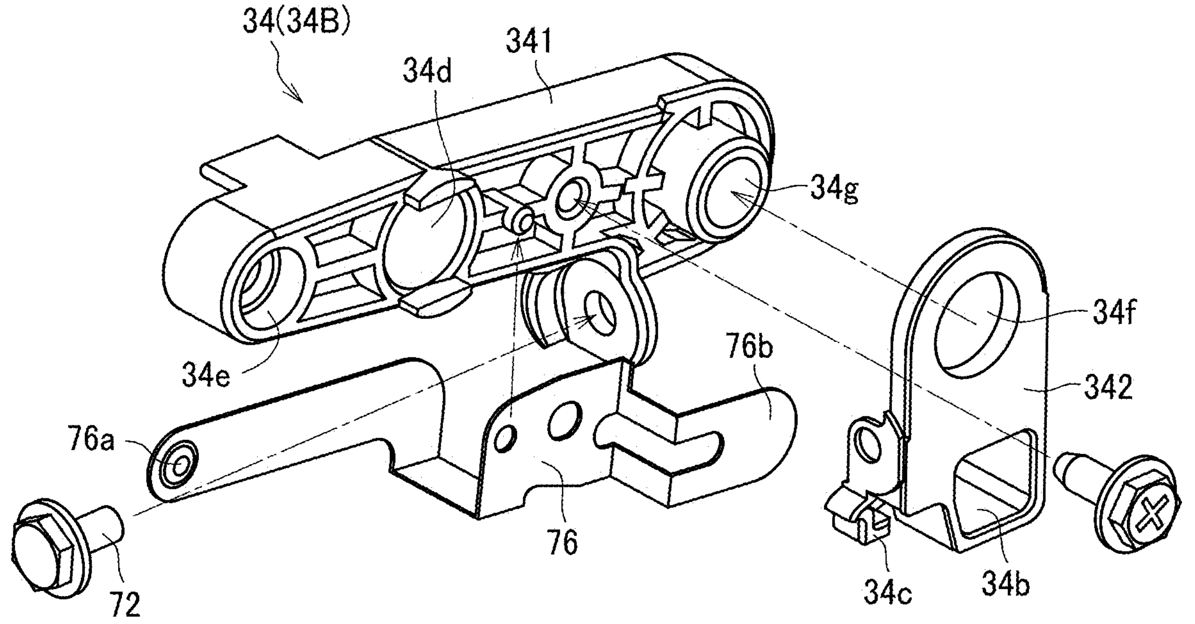
FIG. 11 is an exploded perspective view of the rotating arm of FIG. 10.

As illustrated in FIGS. 10 and 11, similar to the rotating arm 34A, the rotating arm 34B includes the first portion 341 and the second portion 342 having a higher rigidity than the first portion 341. The second portion 342 includes a contact portion with which the pin 32*b* (see FIG. 6) contacts and the attachment portion 34*c*. Accordingly, similar to the rotating arm 34A described above, damage to the rotating arm 34B can be reduced. Further, the primary transfer bias can be prevented from being transmitted to the transfer frame.

The direction B1 in which the screw 72 is fastened is a reverse direction parallel to a direction B2 in which the spring 35 applies a force to the rotating arm 34. The direction B1 is a direction orthogonal to the axial direction B3 of the rotation shaft 34*a* of the rotating arm 34.

A plate spring 76 is fixed to the first portion 341 with a screw. The plate spring 76 includes one end 76*a* (see FIG. 11) and another end 76*b*. The end 76*a* is in contact with one end of backup roller 71 in the axial direction of the backup roller 71. The end 76*b* is in contact with one end of the rotation shaft 34*a* (see FIG. 6) in the axial direction of the rotation shaft 34*a*, which is inserted through a shaft hole 34*g* and a shaft hole 34*f*. The plate spring 76 serves as a component to ensure a path from the backup roller 71 to the ground.

The first portion 341 and the second portion 342 of the rotating arm 34B include common components as the first portion 341 and the second portion 342 of the rotating arm 34A. The common components have, for example, substantially the same shapes. Such a configuration can obviate the need of using multiple molds for the rotating arm 34A and the rotating arm 34B. Thus, cost of the rotating arm 34A and the rotating arm 34B can be reduced.

Figure 12:
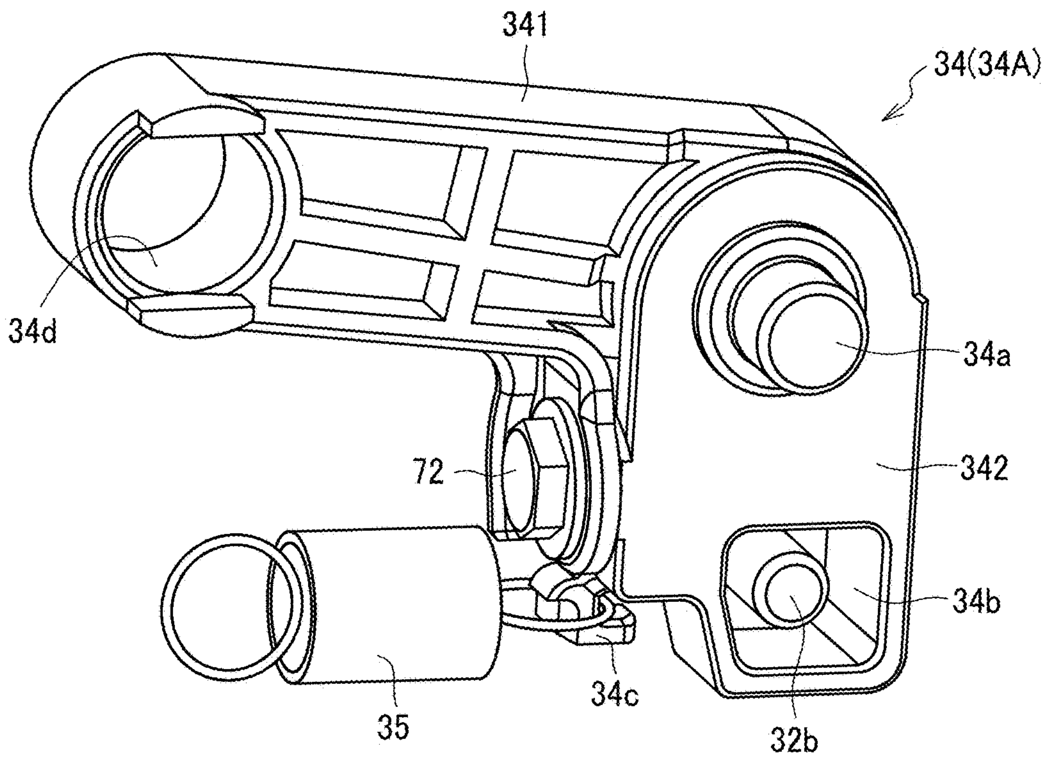
FIG. 12 is a perspective view of a rotating arm disposed on the rear side of the image forming apparatus of FIG. 1, according to an embodiment different from the embodiment illustrated in FIG. 8.
Figure 13:
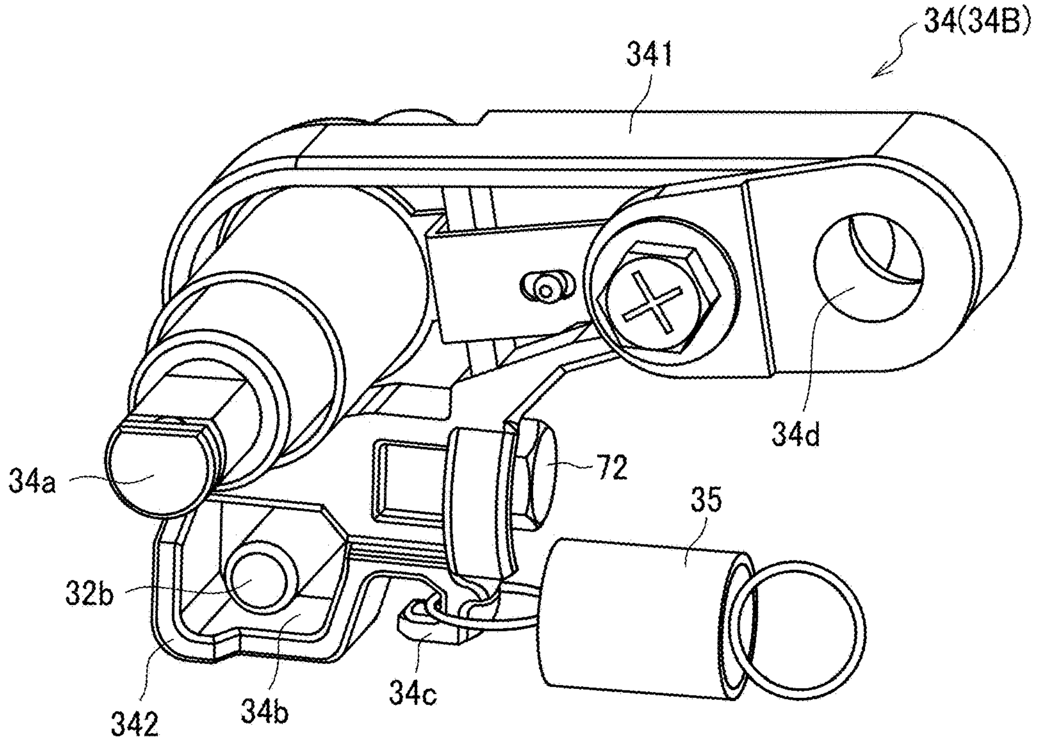
FIG. 13 is a perspective view of a rotating arm disposed on the front side of the image forming apparatus of FIG. 1, according to an embodiment different from the embodiment illustrated in FIG. 10.

Alternatively, the backup roller 71 may not be provided for the primary transfer roller 7T. In this case, as illustrated in FIGS. 12 and 13, the second portions 342 of the rotating arm 34A and the rotating arm 34B may not include the insertion hole 34*e* to hold the shaft of the backup roller 71.

Embodiments of the present disclosure have been described as above. However, embodiments of the present disclosure are not limited to the embodiments described above, and various modifications and improvements are possible without departing from the gist of the present disclosure.

Examples of recording media include not only sheets of paper (plain paper) but also thick paper, postcards, envelopes, plain paper, thin paper, coated paper, art paper, tracing paper, overhead projector (OHP) transparencies, plastic films, prepregs, or copper foil.

In the above description, as in the rotating arm 34 illustrated in FIG. 10, the case has been described in which the attachment portion 34*c*, to which the spring 35 is attached, and the wall surface forming the hole 34*b* as the contact portion, with which the pin 32*b* (see FIG. 6) contacts, are firmed integrally in the second portion 342. In some embodiments, the attachment portion 34*c* and the hole 34*b* may be individual components. Further, embodiments of the present disclosure are not limited to the case in which both the attachment portion 34*c* and the hole 34*b* as the contact portion are formed of the material having the higher rigidity than the first portion 341. In some embodiments, only one of the attachment portion 34*c* and the hole 34*b* as the contact portion may have the higher rigidity than the first portion 341. Even in this case, damage to the rotating arm 34 as the holder can be reduced.

Aspects of the present disclosure are, for example, as follows.

First Aspect

A transfer device includes a belt, a transferor, a holder, a biasing member, and a movement mechanism. The transferor is disposed to be movable to contact the belt. The holder holds the transferor. The biasing member biases the transferor toward the belt. The movement mechanism contacts the holder and causes the transferor to move in a direction opposite to a direction in which the biasing member biases the transferor. The holder includes a contact portion to contact the movement mechanism and a first portion. The contact portion includes a material having a higher rigidity than the first portion.

Second Aspect

A transfer device includes a belt, a transferor, a holder, and a biasing member. The transferor is disposed to be movable to contact the belt. The holder holds the transferor. The biasing member biases the transferor toward the belt. The holder includes an attachment portion to which the biasing member is attached and a first portion. The attachment portion includes a material having a higher rigidity than the first portion.

Third Aspect

In the transfer device according to the first aspect, the holder further includes an attachment portion to which the biasing member is attached. The attachment portion is made of a material having a higher rigidity than the first portion.

Fourth Aspect

In the transfer device according to the third aspect, the holder includes a second portion including the contact portion and the attachment portion as a single component.

Fifth Aspect

In the transfer device according to the fourth aspect, the holder includes a rotation shaft and is disposed to be rotatable around the rotation shaft. The first portion and the second portion are fastened to each other by a fastener. A direction in which the fastener fastens the first portion and the second portion is orthogonal to an axial direction of the rotating shaft.

Sixth Aspect

In the transfer device according to the fourth or fifth aspect, the holder includes a rotation shaft and is disposed to be rotatable around the rotation shaft. The first portion and the second portion are fastened to each other by a fastener. A direction in which the fastener fastens the first portion and the second portion is parallel to a direction in which the biasing member biases the holder.

Seventh Aspect

In the transfer device according to any one of the second to fifth aspects, the holder includes a rotation shaft and is disposed to be rotatable around the rotation shaft. The attachment portion is not in contact with the rotation shaft.

Eighth Aspect

In the transfer device according to any one of the fourth to sixth aspects, or the seventh aspect according to any one of the fourth to sixth aspects, the holder includes a rotation shaft and is disposed to be rotatable around the rotation shaft. The first portion and the second portion are positioned coaxially with the rotation shaft.

Ninth Aspect

In the transfer device according to any one of the third to sixth aspects, or the eighth aspect, or the seventh aspect according to any one of the third to sixth aspects, the contact portion and the attachment portion are made of metal.

Tenth Aspect

In the transfer device according to any one of the first to ninth aspects, the holder holds one end of the transferor in an axial direction of the transferor and another holder holds another end of the transferor in the axial direction of the transferor. The holder and the other holder include same components.

Eleventh Aspect

In the transfer device according to any one of the first to tenth aspects, the first portion is formed of a non-conductive material and includes a holding part to hold the transferor.

Twelfth Aspect

An image forming apparatus includes the transfer device according to any one of the first to eleventh aspects.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. A transfer device comprising:

a belt;

a transferor movable to contact the belt;

a holder to hold the transferor;

a biasing structure to bias the transferor toward the belt; and a movement structure to contact the holder and cause the transferor to move in a direction opposite to a direction in which the biasing structure biases the transferor, the holder including:

a contact portion to contact the movement structure; and a holder portion, and the contact portion comprising a material having a higher rigidity than the holder portion, wherein the holder further includes attachment portion to which the biasing structure is attached, and said attachment portion includes a material having a higher rigidity than the holder portion, wherein the holder includes another holder portion, and said another holder portion includes the contact portion and the attachment portion as a single component, and wherein the transfer device further comprises a fastener to fasten the holder portion and said another holder portion to each other, the holder includes a rotation shaft and is rotatable around the rotation shaft, and the fastener fastens the holder portion and said another holder portion in a direction orthogonal to an axial direction of the rotating shaft.

2. The transfer device according to claim 1, wherein the attachment portion is not in contact with the rotation shaft.

3. The transfer device according to claim 1, wherein the holder portion and said another holder portion are positioned coaxially with the rotation shaft.

4. The transfer device according to claim 1, wherein the contact portion and the attachment portion are made of metal.

5. The transfer device according to claim 1, further comprising another holder, wherein the holder holds one end of the transferor in an axial direction of the transferor and said another holder holds another end of the transferor in the axial direction of the transferor, and wherein the holder and said another holder include same components.

6. The transfer device according to claim 1, wherein the holder portion comprises a non-conductive material, and wherein the holder portion includes a holding part to hold the transferor.

7. An image forming apparatus comprising the transfer device according to claim 1.

8. The transfer device of claim 1, further comprising a photoconductor drum and the transferor movable to contact the photoconductor drum via the belt.

9. A transfer device comprising:

a belt;

a transferor movable to contact the belt;

a holder to hold the transferor;

a biasing structure to bias the transferor toward the belt; and a movement structure to contact the holder and cause the transferor to move in a direction opposite to a direction in which the biasing structure biases the transferor, the holder including:

a contact portion to contact the movement structure; and a holder portion, and the contact portion comprising a material having a higher rigidity than the holder portion, wherein the holder further includes attachment portion to which the biasing structure is attached, and said attachment portion includes a material having a higher rigidity than the holder portion, wherein the holder includes another holder portion, and said another holder portion includes the contact portion and the attachment portion as a single component, and wherein the transfer device further comprises a fastener to fasten the holder portion and said another holder portion to each other, the holder includes a rotation shaft and is rotatable around the rotation shaft, and the fastener fastens the holder portion and said another holder portion in a direction parallel to a direction in which the biasing structure biases the holder.

10. The transfer device according to claim 9, wherein the attachment portion is not in contact with the rotation shaft.

11. The transfer device according to claim 9, wherein the holder portion and said another holder portion are positioned coaxially with the rotation shaft.

12. The transfer device according to claim 9, wherein the contact portion and the attachment portion are made of metal.

13. The transfer device according to claim 9, further comprising another holder, wherein the holder holds one end of the transferor in an axial direction of the transferor and said another holder holds another end of the transferor in the axial direction of the transferor, and wherein the holder and said another holder include same components.

14. The transfer device according to claim 9, wherein the holder portion comprises a non-conductive material, and wherein the holder portion includes a holding part to hold the transferor.

15. The transfer device according to claim 9, further comprising a photoconductor drum and the transferor movable to contact the photoconductor drum via the belt.

16. An image forming apparatus comprising the transfer device according to claim 9.

17. A transfer device, comprising:

a belt;

a transferor movable to contact the belt;

a holder to hold the transferor;

a biasing structure to bias the transferor toward the belt;

a movement structure to contact the holder and cause the transferor to move in a direction opposite to a direction in which the biasing structure biases the transferor; and a photoconductor drum, the holder including:

a contact portion to contact the movement structure; and a holder portion, and the contact portion comprising a material having a higher rigidity than the holder portion, wherein the holder further includes attachment portion to which the biasing structure is attached, and the attachment portion includes a material having a higher rigidity than the holder portion, wherein the holder includes another holder portion, and the another holder portion includes the contact portion and the attachment portion as a single component, wherein the holder further includes a rotation shaft and is rotatable around the rotation shaft, and the rotation shaft is disposed inside a loop of the belt of the transferor, and wherein the transferor is movable to contact the photoconductor drum via the belt.

18. An image forming apparatus comprising the transfer device according to claim 17.

* * * * *